United States Patent
Kim et al.

(10) Patent No.: US 8,228,437 B2
(45) Date of Patent: Jul. 24, 2012

(54) METHOD AND APPARATUS FOR PROCESSING VIDEO DATA OF LIQUID CRYSTAL DISPLAY DEVICE

(75) Inventors: Young Ho Kim, Paju-si (KR); Sung Jo Koo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 441 days.

(21) Appl. No.: 12/585,508

(22) Filed: Sep. 16, 2009

(65) Prior Publication Data

US 2010/0157159 A1    Jun. 24, 2010

(30) Foreign Application Priority Data

Dec. 23, 2008 (KR) .......................... 10-2008-0132005

(51) Int. Cl.
*H04N 5/00* (2011.01)
(52) U.S. Cl. ........... 348/620; 348/621; 348/790; 345/89
(58) Field of Classification Search .......... 348/618–631, 348/791–793; 345/89
See application file for complete search history.

(56) References Cited

U.S. PATENT DOCUMENTS

| 7,209,106 B2 * | 4/2007 | Lu et al. ........................ 345/89 |
| 2005/0162566 A1 | 7/2005 | Chuang et al. |
| 2005/0225522 A1 | 10/2005 | Wu et al. |
| 2008/0001872 A1 | 1/2008 | Abe |
| 2008/0279470 A1 | 11/2008 | Warmuth et al. |

FOREIGN PATENT DOCUMENTS

| JP | 2004-341549 | 12/2004 |
| KR | 10-2006-0084718 | 7/2006 |

* cited by examiner

*Primary Examiner* — Michael Lee
(74) *Attorney, Agent, or Firm* — McKenna Long & Aldridge LLP

(57) ABSTRACT

A video processing method and apparatus for a liquid crystal display (LCD) device is disclosed. The video processing method for the LCD device includes detecting noise by comparing data of a previous frame with data of a current frame, if the noise is detected, removing the noise from the current frame data, and outputting the resultant current frame data having no noise together with the previous frame data, and comparing the previous frame data with the resultant current frame data having no noise in a lookup table, selecting overdriving data corresponding to the comparison result, and outputting the selected overdriving data.

5 Claims, 6 Drawing Sheets

METHOD AND APPARATUS FOR PROCESSING VIDEO DATA OF LIQUID CRYSTAL DISPLAY DEVICE

This application claims the benefit of Korean Patent Application No. 10-2008-132005, filed on Dec. 23, 2008, which is hereby incorporated by reference as if fully set forth herein.

BACKGROUND OF THE INVENTION

1. Field of the Invention

The present invention relates to a liquid crystal display device, and more particularly to a method and apparatus for processing video data of the liquid crystal display device capable of preventing a video quality from being deteriorated by an overdriven action (hereinafter referred to as an overdriving action).

2. Discussion of the Related Art

A liquid crystal display (LCD) device displays video or video data using electrical and optical characteristics of a liquid crystal. In more detail, the liquid crystal display (LCD) device includes a liquid crystal panel for displaying video or video data through a pixel matrix and a driving circuit for driving the liquid crystal panel. Since the LCD device is a non-emissive element, the LCD device includes a backlight unit for emitting light at a backside of the liquid crystal panel. The liquid crystal panel changes a liquid-crystal alignment status of respective sub-pixels according to video signals, adjusts a transmission rate of the light emitted from the backlight unit, such that it displays video or video data thereon. This LCD device has been widely used to various displays from small-sized displays to large-sized displays, for example, mobile communication terminals, mobile computers, LCD TVs, etc.

The LCD display has a structure of an active matrix type, each sub-pixel of which includes a thin film transistor (TFT) used as a switching element. However, due to not only a slow response speed caused by unique viscosity and elasticity of the liquid crystal, but also hold-type driving characteristics, a motion blur effect caused by an afterimage (i.e., image retention) of a previous frame unavoidably occurs when moving videos or motion pictures are reproduced.

Figure 1A:
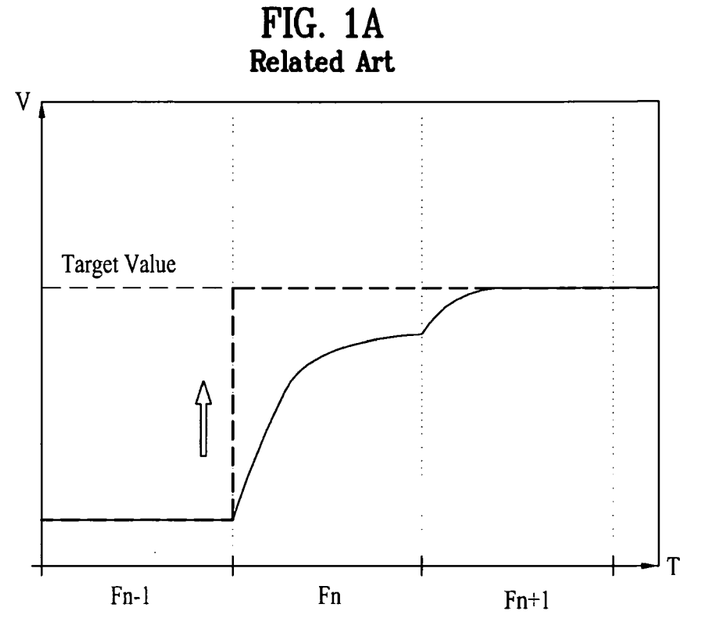
FIGS. 1A and 1B show overdriving methods of a liquid crystal display (LCD) device of the related art.
Figure 1B:
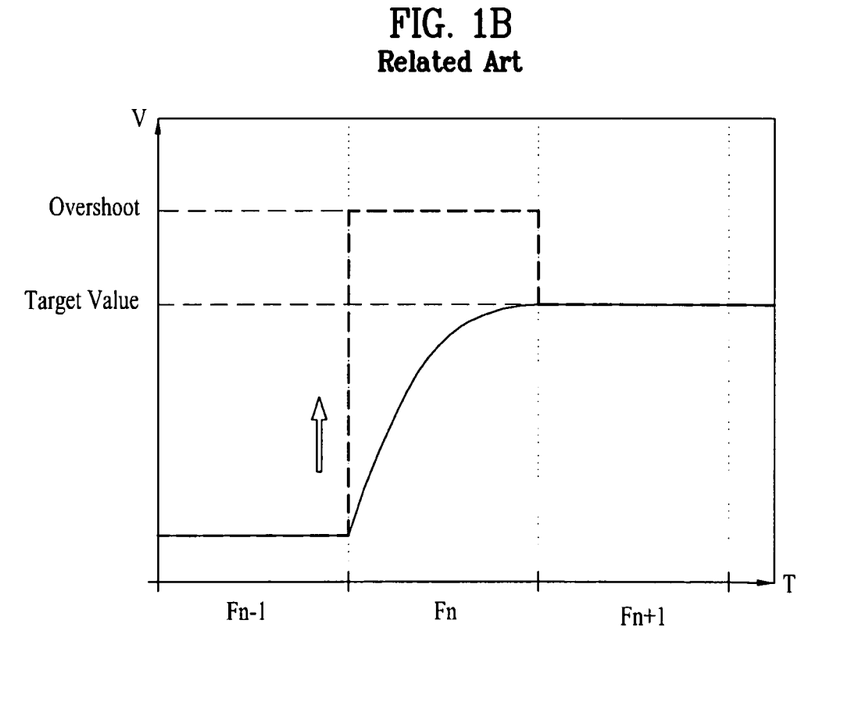

For example, as shown in FIG. 1A, if a data voltage applied to a liquid crystal at an n-th frame (Fn) is changed, a luminance or brightness is not directly changed to a target gray level, but is slowly changed from a gray level of a previous frame (Fn−1) to the target gray level, such that the changed result unavoidably affects even the next frame (Fn+1), resulting in the occurrence of an afterimage. In order to solve the above-mentioned problem, an overshoot voltage higher than a target voltage is applied at a data changing moment, such that an overdriving method for improving a liquid crystal response speed in proportion to the applied voltage has been widely used. This overdriving method compares data of a previous frame with data of a current frame. If a difference in data between the previous frame and the current frame is equal to or higher than 1, the data of the current frame is changed to overdriving data such that the overdriving data is outputted.

In the meantime, a quantization error of more than one gray level (i.e., 1 gray level) may occur in a quantization process for sampling analog broadcast signals received from a television (TV) to digital data. Therefore, although the analog broadcast signal corresponds to a still image, individual frames may output different digital data due to the quantization error. However, components of the quantization error are amplified by an overdriving circuit during a data processing step of the LCD device, such that they appear as noise on the screen.

Also, if overdriving circuit of the related art independently changes red (R), green (G), and blue (B) data to overdriving data and increases overdriving components to make a faster response speed, color inversion occurs, resulting in deterioration of an video quality.

SUMMARY OF THE INVENTION

Accordingly, the present invention is directed to a method and apparatus for processing video data of a liquid crystal display (LCD) device that substantially obviates one or more problems due to limitations and disadvantages of the related art.

An object of the present invention is to provide a method and apparatus for processing video data of a liquid crystal display (LCD) device so as to prevent a video quality from being deteriorated by the overdriving of data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video processing method for a liquid crystal display (LCD) device includes: detecting noise by comparing data of a previous frame with data of a current frame; if the noise is detected, removing the noise from the current frame data, and outputting the resultant current frame data having no noise together with the previous frame data; and comparing the previous frame data with the resultant current frame data having no noise in a lookup table, selecting overdriving data corresponding to the comparison result, and outputting the selected overdriving data.

The detecting of the noise may include: detecting a difference in data between the previous frame and the current frame by comparing the previous frame data with the current frame data; and comparing the data difference between the previous frame and the current frame with a predetermined threshold value, detecting the data difference as noise if the data difference between the previous frame and the current frame is less than the threshold value, and detecting the data difference as non-noise if the data difference between the previous frame and the current frame is equal to or higher than the threshold value.

The removing of the noise may include, if the noise is detected, outputting the current frame data as the same data as that of the previous frame data, thereby removing the noise component. The selecting of the overdriving data may include, if the previous frame data is equal to the current frame data, selecting data equal to the current frame data, and outputting the selected data.

In another aspect of the present invention, there is provided a video processing method for a liquid crystal display (LCD) device including: transforming gray level data of previous and current frames into brightness and chrominance data; comparing the brightness data of the previous frame with the brightness data of the current frame in a lookup table, selecting overdriving brightness data corresponding to the comparison result, and outputting the selected overdriving brightness data; and performing an inverse-transform process to the gray level data using the overdriving brightness and the chrominance data of the current frame.

The method may further include, before the transforming the gray level data into the brightness and chrominance data, detecting a difference in data between the previous frame and the current frame by comparing the gray level data of the previous frame with the gray level data of the current frame; comparing the data difference between the previous frame and the current frame with a predetermined threshold value, detecting the data difference as noise if the data difference between the previous frame and the current frame is less than the threshold value, and detecting the data difference as non-noise if the data difference between the previous frame and the current frame is equal to or higher than the threshold value; and if the noise is detected, outputting the gray level data of the current frame as data equal to the gray level data of the previous frame.

In another aspect of the present invention, there is provided a video processing apparatus for a liquid crystal display (LCD) device including: a noise removing filter which detects noise by comparing data of a previous frame with data of a current frame, if the noise is detected, removes the noise from the current frame data, and outputs the resultant current frame data having no noise together with the previous frame data; and a lookup table which compares the previous frame data generated from the noise removing filter with the current frame data generated from the noise removing filter, selects overdriving data corresponding to the comparison result, and outputs the selected overdriving data.

The noise removing filter may detect a difference in data between the previous frame and the current frame by comparing the previous frame data with the current frame data, compares the data difference between the previous frame and the current frame with a predetermined threshold value, detects the data difference as noise if the data difference between the previous frame and the current frame is less than the threshold value, detects the data difference as non-noise if the data difference between the previous frame and the current frame is equal to or higher than the threshold value, and outputs the current frame data as data equal to the previous frame data if the noise is detected; and the lookup table, if the previous frame data generated from the noise removing filter is equal to the current frame data generated from the noise removing filter, may select the same data as the current frame data, and outputs the selected data.

In another aspect of the present invention, there is provided a video processing apparatus for a liquid crystal display (LCD) device including: a color-space transform unit for transforming gray level data of previous and current frames into brightness and chrominance data; a lookup table for comparing the previous frame brightness data with the current frame brightness data generated from the color-space transform unit, selecting overdriving brightness data corresponding to the comparison result, and outputting the selected overdriving brightness data; and a color-space inverse transform unit for performing an inverse-transform process to the gray level data using the overdriving brightness received from the lookup table and the current frame's chrominance data received from the color-space transform unit.

The apparatus may further include: a noise removing filter which is connected to an input terminal of the color-space transform unit, detects a difference in data between the previous frame and the current frame by comparing the gray level data of the previous frame with the gray level data of the current frame, compares the data difference between the previous frame and the current frame with a predetermined threshold value, detects the data difference as noise if the data difference between the previous frame and the current frame is less than the threshold value, and detects the data difference as non-noise if the data difference between the previous frame and the current frame is equal to or higher than the threshold value, and if the noise is detected, outputs the gray level data of the current frame as data equal to the gray level data of the previous frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawing.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
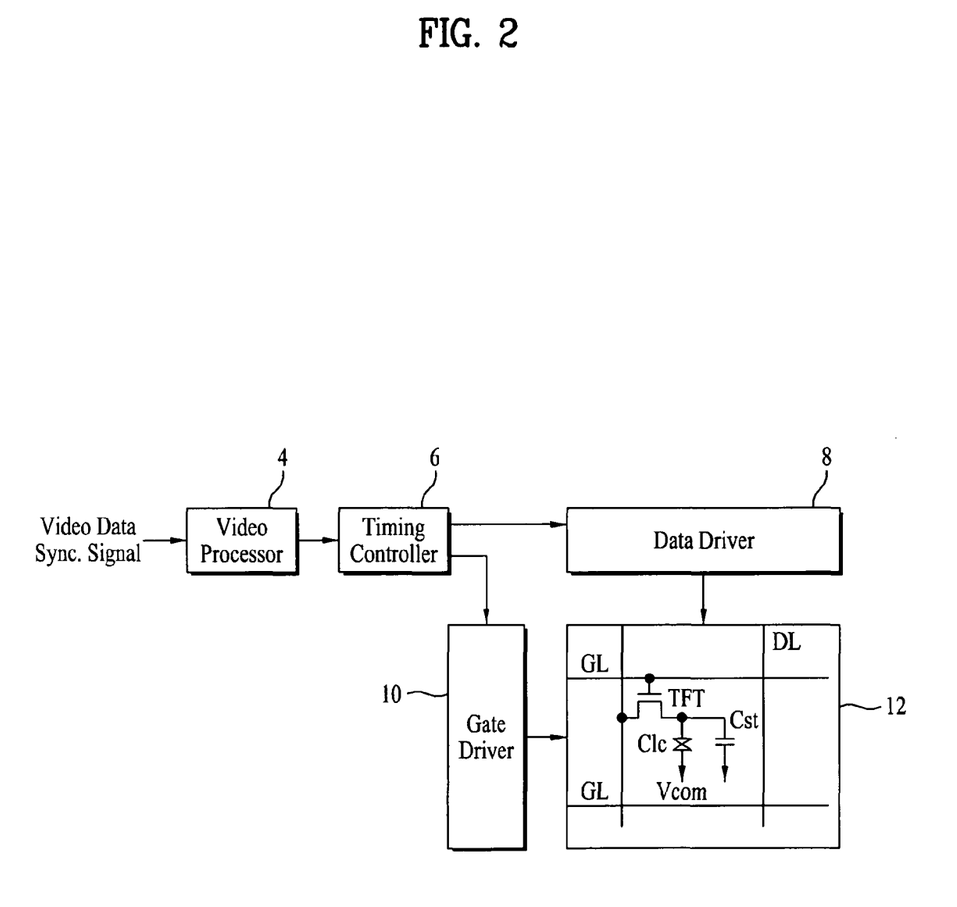
FIG. 2 is a block diagram illustrating a liquid crystal display (LCD) device according to a first embodiment of the present invention.

FIG. 2 is a block diagram illustrating a liquid crystal display (LCD) device according to a first embodiment of the present invention.

Referring to FIG. 2, the LCD device includes: a liquid crystal panel 12 for displaying a video; a data driver 8 for driving a data line (DL) of the liquid crystal panel 12; a gate driver 10 for driving a gate line (GL) of the liquid crystal panel 12; a video processor 4 for transforming input data into overdriving data by removing a noise component of the input data, and outputting the transformed result; and a timing controller 6 for arranging video data received from the video processor 4, providing the data driver 8 with the arranged data, and controlling the data driver 8 and the gate driver 10.

The video processor 4 compares data of a previous frame with data of a current frame, and modulates the data of the current frame into overdriving data according to the result of comparison, such that it outputs the modulated result. In this case, if data of the previous frame is equal to data of the current frame, the video processor 4 does not modulate the current frame data to prevent the overdriving of the current frame data, but outputs the same data as that of the current frame. Also, the video processor 4 compares a difference in data between consecutive frames with a predetermined threshold value, detects a noise component according to the result of comparison, removes the detected noise component from input data, and modulates the resultant input data into overdriving data. The noise component caused by a quantization error generated when an external system converts analog signals into digital data, is relatively small like one gray level (i.e., 1 gray level). Therefore, if the difference in data between consecutive frames is lower than the threshold value, the video processor 4 determines the occurrence of noise. If the noise component has been detected, the video processor 4 controls data of the previous frame to be equal to data of the current frame, does not modulate the current frame data to prevent the overdriving, but outputs the same data as the current frame data. In this case, the threshold value for deciding the presence or absence of the noise component is an optimum threshold value which has already been established by many experiments conducted by a system designer. Therefore, this threshold value may be used to prevent the noise component of input data from being amplified by the overdriving. Detailed descriptions of the video processor 4 will be described later.

The timing controller 6 arranges output data of the video processor 4, and outputs the arranged data to the data driver 8. The timing controller 6 receives a plurality of synchronous signals (i.e., a dot clock, a data enable signal, a horizontal synchronization signal, and a vertical synchronous signal) from the video processor 4, generates a data control signal for controlling a driving timing of the data driver 8 and a gate control signal for controlling a driving timing of the gate driver 10 using the synchronous signals, and outputs the data control signal and the gate control signal.

The data driver 8, in response to the data control signal from the timing controller 6, converts digital video data generated from the timing controller 6 into an analog data signal (i.e., a pixel voltage signal) using a gamma voltage, such that it outputs the analog data signal to the data line (DL) of the liquid crystal panel.

The gate driver 10, in response to the gate control signal from the timing controller 6, sequentially drives the gate line (GL) of the liquid crystal panel 12.

The liquid crystal panel 12 displays video data or an video through a pixel matrix in which a plurality of pixels are arranged. Individual pixels implement a desired color using a combination of red (R), green (G), and blue (B) pixels adjusting a light transmission rate by varying a liquid crystal arrangement based on the data signal. Each sub-pixel includes not only a thin film transistor (TFT) connected to the gate line (GL) and the data line (DL), but also a liquid crystal capacitor (Clc) and a storage capacitor (Cst) which are connected in parallel to the TFT. This liquid crystal capacitor (Clc) is charged with a voltage difference between the data signal having been applied to the pixel electrode through the TFT and a common voltage (Vcom) applied to the common electrode, and drives a liquid crystal according to the charged voltage, so that it may adjust a light transmission rate. The storage capacitor (Cst) stably maintains the voltage charged in the liquid crystal capacitor (Clc). When the liquid crystal panel 12 displays an video having a large difference in data between frames, it is charged with a voltage corresponding to data which has been overdriving-modulated by the video processor 4, such that it can increase a response speed of the liquid crystal by the charged voltage. On the contrary, when the liquid crystal panel 12 displays another video having a small difference in data between frames, it is charged with a voltage corresponding to data which has not been overdriving-modulated by the video processor 4, such that it may prevent the occurrence of noise caused by the overdriving.

Figure 3:
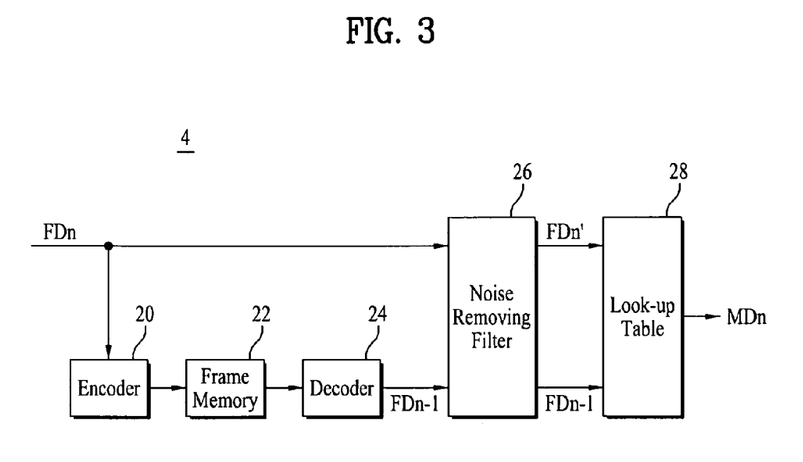
FIG. 3 is a detailed block diagram illustrating a video processor shown in FIG. 2.
Figure 4:
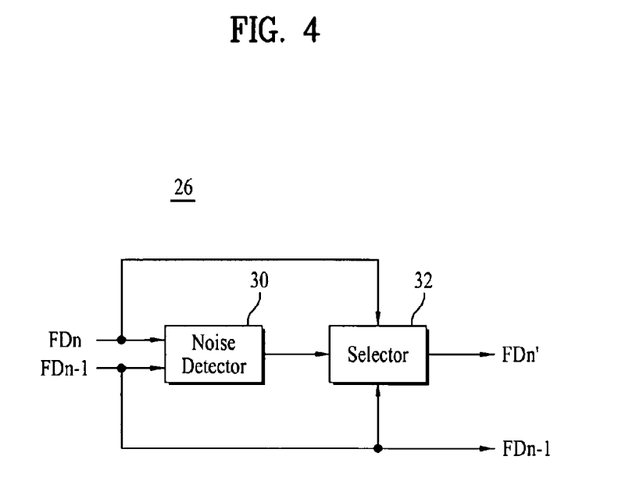
FIG. 4 is a detailed block diagram illustrating a noise removing filter shown in FIG. 3.

FIG. 3 is a detailed block diagram illustrating the video processor 4 shown in FIG. 2. FIG. 4 is a detailed block diagram illustrating the noise removing filter 26 shown in FIG. 3.

Referring to FIG. 3, the video processor 4 includes an encoder 20, a frame memory 22, a decoder 24, a noise removing filter 26, and a lookup table 28. The noise removing filter 26 includes a noise detector 30 and a selector 32.

The encoder 20, the frame memory 22, and the decoder 24 may delay input data (FDn) of a current frame by one frame, and the delayed data is equal to previous frame data (FDn−1), such that the previous frame data (FDn−1) is applied to the noise removing filter 26. The encoder 20 reduces the number of bits by compressing the input data (FDn) of the current frame, such that the compressed result is stored in the frame memory 22. Therefore, a capacity of the frame memory 22 can be reduced. The frame memory 22 stores the compressed data received from the encoder 20 during only one frame such that the stored data is delayed by one frame. As a result, the delayed result is outputted as the compressed data of a previous frame to the decoder 24. The decoder 24 receives the previous-frame's compression data from the frame memory 22, and recovers the received data so that the recovered data has the number of bits made prior to the compression. The decoder 24 outputs the recovered previous-frame data (FDn−1) to the noise removing filter 26. In this case, the encoder 20 and the decoder 24 may be used to reduce the capacity of the frame memory 22, such that they may herein be omitted for the convenience of description.

The noise removing filter 26 detects noise by comparing previous-frame data (FDn−1) with current-frame data (FDn). If the noise has been detected, the noise removing filter 26 outputs not only current frame data (FD') obtained when a noise component is removed from the current frame data (FDn), but also the previous-frame data (FDn−1) to the lookup table 28. In other words, if the noise has been detected, the noise removing filter 26 outputs the current frame data (FD') to the lookup table 28 in the same manner as in the previous frame data (FDn−1), so that it removes the noise from the received data. If the noise has not been detected, the noise removing filter 26 outputs the current-frame data (FDn) and the previous-frame data (FDn−1) to the lookup table 28 without any change. For the above-mentioned operation, the noise removing filter 26 includes a noise detector 30 and a selector 32 as shown in FIG. 4.

The noise detector 30 shown in FIG. 4 compares received current-frame data (FDn) with previous frame data (FDn−1), such that it may detect a difference in data between frames according to the result of comparison. The noise detector 30 compares the difference in data between frames with a threshold value. In this case, if the difference in data between frames is lower than the threshold value, this difference in data between frames is detected as noise. If the difference in data between frames is equal to or higher than the threshold value, this difference may not be detected as the noise.

The selector 32 shown in FIG. 4, in response to the output data from the noise detector 30, selects either of current frame data (FDn) and previous frame data (FDn−1), and outputs the selected data as new current frame data (FDn'). If the noise detector 30 detects noise, the selector 32 selects the previous frame data (FDn−1) and outputs the selected data (FDn−1) as current frame data (FDn'). If the noise detector 30 detects no noise, the selector 32 selects and outputs current frame data (FDn). If the noise detector 30 detects the noise, this means that a difference between the previous frame data (FDn−1) and the current frame data (FDn) corresponds to the noise component, such that the selector 32 outputs previous frame data (FDn−1) as the current frame data (FDn') and thus the noise component of the current frame data can be removed. As a result, if the noise has been detected by the noise detector 30, the current frame data (FDn') generated from the selector 32 becomes bypass previous frame data (FDn−1), such that the current frame data (FDn') is not modulated into overdriving data in the lookup table 28.

The lookup table 28 compares the current frame data (FDn') generated from the noise removing filter 26 with the previous frame data (FDn−1), selects overdriving data corresponding to the comparison result, and outputs the selected overdriving data. The lookup table 28 includes overdriving data, which has been mapped to the current frame data (FDn') and the previous frame data (FDn−1). Overdriving data larger than the current frame data (FDn') is stored in a specific area of the lookup table 28, where the current frame data (FDn') is larger than the previous frame data (FDn−1) in this specific area. Another overdriving data smaller than the current frame data (FDn') is stored in another specific area of the lookup table 28, where the current frame data (FDn') is smaller than the previous frame data (FDn−1) in the another specific area. If the current frame data (FDn') is equal to the previous frame data (FDn−1) in a specific area of the lookup table 28, this specific area stores data which is equal to the current frame data (FDn') and the previous frame data (FDn−1). Therefore, if the current frame data (FDn') is larger than the previous frame data (FDn−1), the lookup table 28 selects overdriving data larger than the current frame data (FDn') and outputs it. If the current frame data (FDn') is smaller than the previous frame data (FDn−1), the lookup table 28 selects overdriving data smaller than the current frame data (FDn') and outputs it. In addition, if the current frame data (FDn') is equal to the previous frame data (FDn−1), the lookup table 28 selects the same data as the current frame data (FDn') and outputs it. Accordingly, if noise component is removed by the noise removing filter 26 contained in a previous stage so that the current frame data (FDn') is the same as the previous frame data (FDn−1), the current frame data (FDn') may not be overdriven.

Figure 5A:
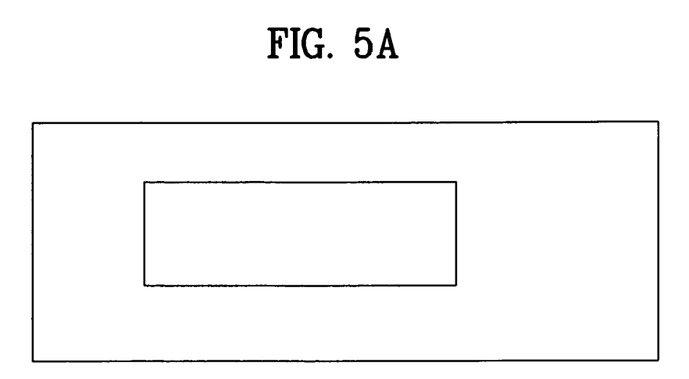
FIGS. 5A to 5C illustrate a color inversion caused by an overdriving modulation of gray-level data and the prevention of color inversion caused by an overdriving modulation of brightness data of a second embodiment of the present invention.
Figure 5B:
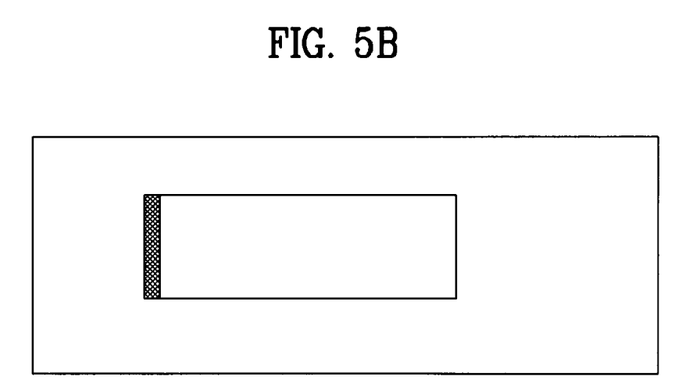
Figure 5C:
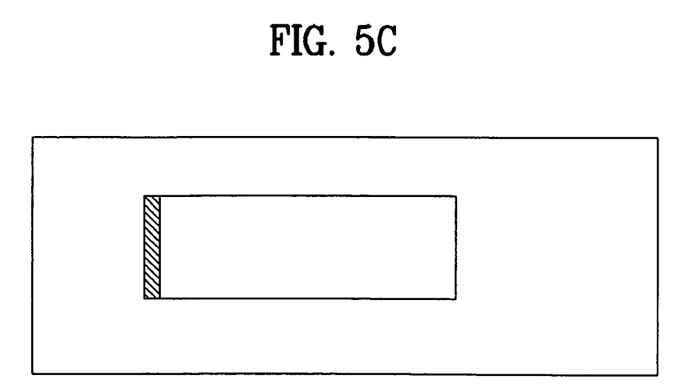

In the meantime, if an overdriving value becomes higher to increase a response speed while each of red (R) data, green (G), data and blue (B) data is modulated into overdriving data, there may arise a color inversion caused by the overdriving. For example, if RGB data of a previous frame is (0, 255, 255) and RGB data of a current frame is (128, 128, 128), the R data is modulated into 170 due to the change of 0→128, and the G or B data is modulated into 100 due to the change of 255→128, such that RGB data of the current frame is changed from (128, 128, 128) to (170, 100, 100). If a cyan box of an ash-colored Wallpaper shown in FIG. 5A moves as shown in FIG. 5B, a color-inversion belt may occur due to the above-mentioned overdriving. In order to prevent the occurrence of the color-inversion belt, the LCD device according to a second embodiment of the present invention transforms RGB data into brightness data, and performs overdriving modulation thereon. For example, brightness data of RGB data (0, 255, 255) of a previous frame becomes 178, and brightness data of RGB data (128, 128, 128) of a current frame becomes 128. Overdriving brightness data corresponding to brightness data (178, 128) of the previous and current frames becomes about 90. If this brightness data of about 90 is inverse-transformed into RGB data, the transformed data becomes (90, 90, 90), such that it may prevent the color inversion as shown in FIG. 5C.

Figure 6:
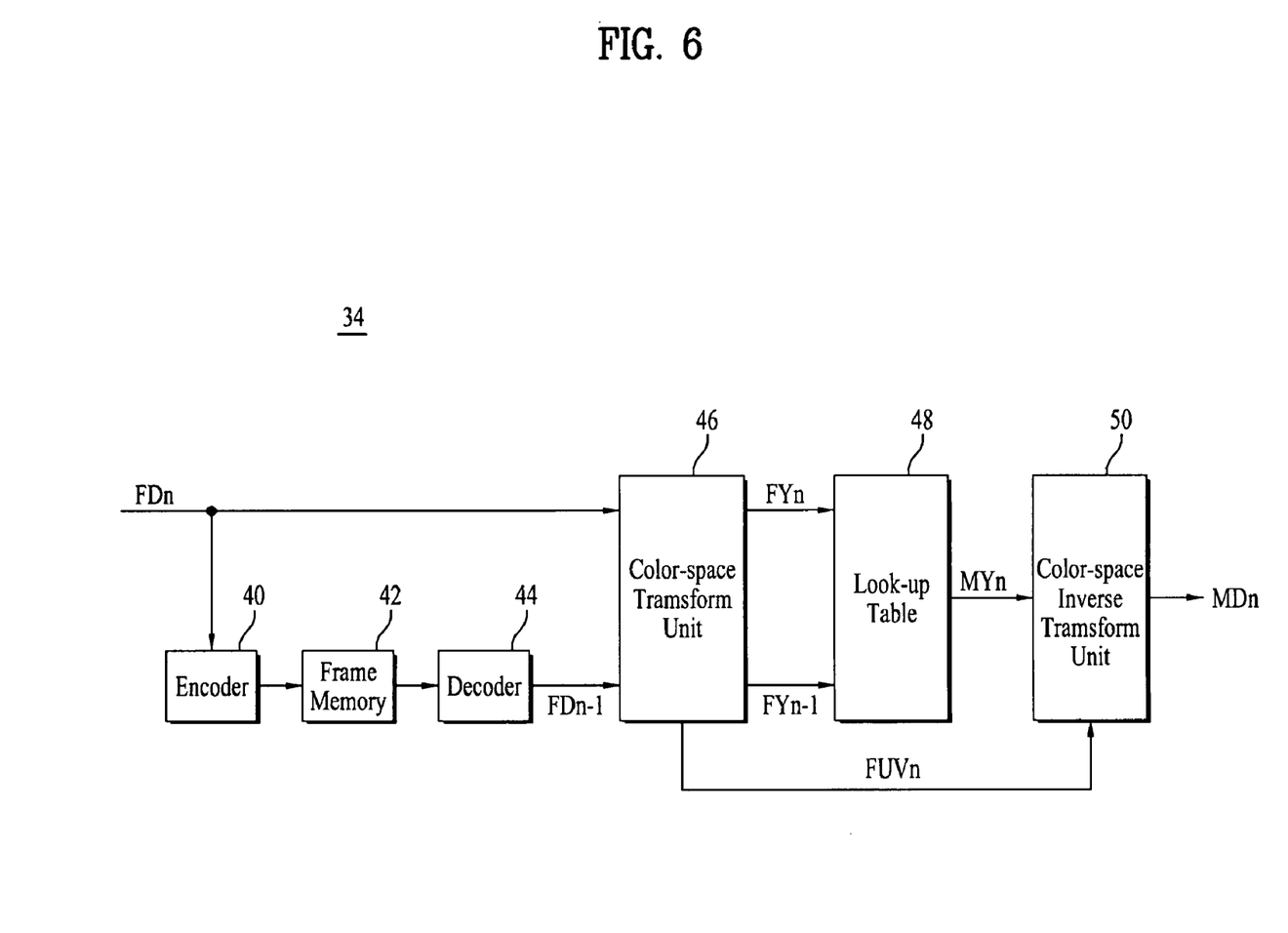
FIG. 6 is a block diagram illustrating a liquid crystal display (LCD) device according to a second embodiment of the present invention.

FIG. 6 is a block diagram illustrating a liquid crystal display (LCD) device according to a second embodiment of the present invention.

Referring to FIG. 6, the video processor 34 includes an encoder 40, a frame memory 42, a decoder 44, a color-space transform unit 46, a lookup table 48, and a color-space inverse transform unit 50.

The encoder 40, the frame memory 42, and the decoder 44 may delay input data (FDn) of a current frame by one frame, and the delayed data becomes equal to previous frame data (FDn−1), such that the previous frame data (FDn−1) is applied to the color-space transform unit 46. The encoder 40 reduces the number of bits by compressing the input data (FDn) of the current frame, such that the compressed result is stored in the frame memory 42. The frame memory 42 stores the compressed data received from the encoder 40 during only one frame such that the stored data is delayed by one frame. As a result, the delayed result is outputted as the compressed data of the previous frame to the decoder 44. The decoder 44 receives the previous-frame's compression data from the frame memory 42, and recovers the received data so that the recovered data has the number of bits made prior to the compression. The decoder 44 outputs the recovered previous-frame data (FDn−1) to the color-space transform unit 46. In this case, the encoder 40 and the decoder 44 may be used to reduce the capacity of the frame memory 42, such that they may be herein omitted for the convenience of description.

The color-space transform unit 46 transforms RGB data (FDn−1) of the previous frame and RGB data (FDn) of the current frame into YUV data. The color-space transform unit 46 transforms RGB data (FDn−1) of the previous frame into YUV data using the following equation 1.

$$Y=0.229 \times R+0.587 \times G+0.114 \times B$$

$$U=0.493 \times (B-Y)$$

$$V=0.887 \times (R-Y) \quad \text{[Equation 1]}$$

The color-space transform unit 46 transmits brightness data (FYn−1 and FYn) of the previous and current frames to the lookup table 48. Chrominance data (FUVn) of the current frame is outputted to the color-space inverse transform unit 50.

The lookup table 48 compares brightness data (FYn−1) of the previous frame with brightness data (FYn) of the current frame, and selects and outputs overdriving brightness data (MYn) corresponding to the comparison result. The lookup table 28 includes overdriving brightness data (MYn), which has been mapped to the current frame brightness data (FY) and the previous frame brightness data (FYn−1). Overdriving brightness data (MYn) larger than the current frame brightness data (FYn) is stored in a specific area of the lookup table 48, where the current frame brightness data (FYn) is larger than the previous frame brightness data (FYn−1) in this specific area. Another overdriving brightness data (MYn) smaller than the current frame brightness data (FYn) is stored in another specific area of the lookup table 48, where the current frame brightness data (FYn) is smaller than the previous frame brightness data (FYn−1) in the another specific area. If the current frame brightness data (FYn) is equal to the previous frame brightness data (FYn−1) in a specific area of the lookup table 48, this specific area stores data which is equal to the current frame brightness data (FYn) and the previous frame brightness data (FYn−1). Therefore, if the current frame brightness data (FYn) is larger than the previous frame brightness data (FYn−1), the lookup table 48 selects overdriving brightness data (MYn) larger than the current frame brightness data (FYn) and outputs it. If the current frame brightness data (FYn) is smaller than the previous frame brightness data (FYn−1), the lookup table 28 selects overdriving brightness data (MYn) smaller than the current frame brightness data (FYn) and outputs it. In addition, if the current frame brightness data (FYn) is equal to the previous frame brightness data (FYn−1), the lookup table 48 selects the same brightness data (MYn) as the current frame brightness data (FYn) and outputs it.

The color-space inverse transform unit 50 inverse-transforms the overdriving brightness data (MYn) generated from the lookup table 48 and the chrominance (FUVn) generated from the color-space transform unit 46 into RGB data, and then outputs the RGB data to the timing controller 6 shown in FIG. 2. The color-space inverse transform unit 50 inverse-transforms the overdriving brightness data (MY) and the chrominance data (U, V) into RGB data using the following equation 2.

$$R = MY + 0.000 \times U + 1.140 \times V$$

$$G = MY - 0.396 \times U - 0.581 \times V$$

$$B = MY + 2.029 \times U + 0.000 \times V \qquad \text{[Equation 2]}$$

In this way, the video processor of the LCD device according to the second embodiment of the present invention converts RGB data into brightness data, modulates the brightness data into overdriving brightness data, and inverse-transforms the overdriving brightness data into the RGB data, such that it may prevent the color inversion caused by the overdriving.

Figure 7:
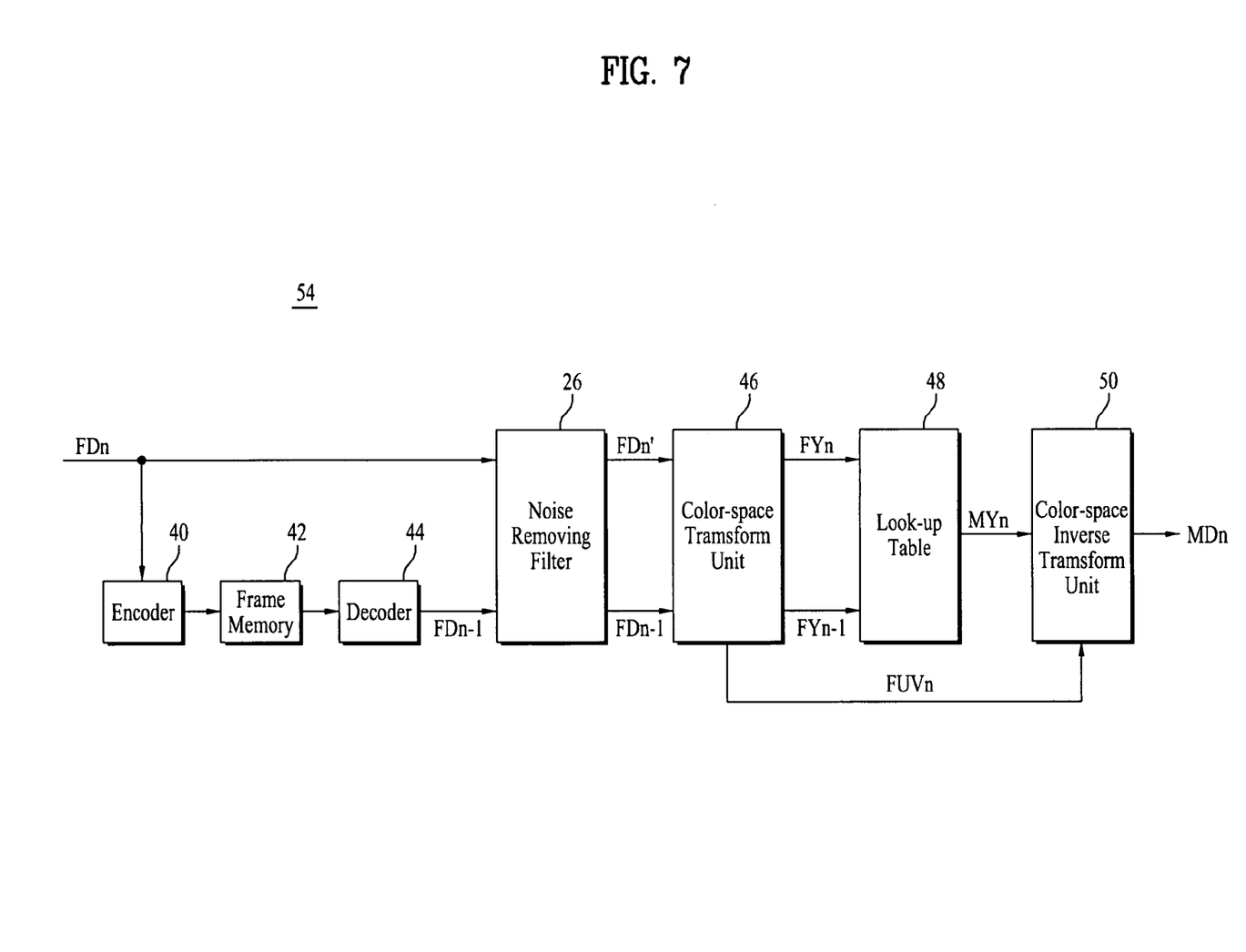
FIG. 7 is a block diagram illustrating a liquid crystal display (LCD) device according to a third embodiment of the present invention.

FIG. 7 is a block diagram illustrating a liquid crystal display (LCD) device according to a third embodiment of the present invention.

In case of comparing the video processor 54 of FIG. 7 with the video processor 34 of FIG. 6, the video processor 54 of FIG. 7 further includes the noise removing filter 26 of FIG. 3 at a location between the decoder 44 and the color-space transform unit 46, differently from the other video processor 34 of FIG. 6. The remaining parts other than the noise removing filter 26 in FIG. 7 are the same as those of FIG. 6, such that their detailed description will herein be omitted for the convenience of description.

The encoder 40, the frame memory 42, and the decoder 44 may delay the current frame data (Fn) by one frame, and may then output the delayed result as the previous frame data (FDn−1).

The noise removing filter 26 compares data (FDn−1) of the previous frame with data (FDn) of the current frame as described above. If any noise has been detected by the noise removing filter 26, the current frame data (FDn) and the previous frame data (FDn−1) are equally generated from the noise removing filter 26.

The color-space transform unit 46 receives RGB data (FDn−1) of the previous frame and RGB data (FDn) of the current frame from the noise removing filter 26, transforms the received RGB data (FDn−1 and FDn) into YUV data, outputs brightness data (FYn and FYn−1) of the previous and current frames to the lookup table 48, and outputs UV data of the current frame into the color-space inverse transform unit 50.

The lookup table 48 receives brightness data (FYn−1) of the previous frame and brightness data (FYn) of the current frame from the color-space transform unit 46, compares the brightness data (FYn−1) of the previous frame with the brightness data (FYn) of the current frame, selects overdriving brightness data (MYn) corresponding to the comparison result, and outputs it. Here, if the current frame brightness data (FYn) is equal to the previous frame brightness data (FYn−1), the lookup table 48 selects the same brightness data (MYn) as the current frame brightness data (FYn), and outputs the selected brightness data (MYn).

The color-space inverse transform unit 50 inverse-transforms the overdriving brightness data (MYn) generated from the lookup table 48 and the chrominance data (FUVn) generated from the color-space transform unit 46 into RGB data, and outputs the resultant RGB data to the timing controller 6 shown in FIG. 2.

In this way, the video processor of the LCD device according to a third embodiment of the present invention removes noise components from the input RGB data, transforms the input RGB data into brightness data, modulates the brightness data into overdriving brightness data, and inverse-transforms the overdriving brightness data into the RGB data, such that it prevents noise and color inversion caused by the overdriving.

As apparent from the above-mentioned description, the video processing method and apparatus for the LCD device according to the present invention compares data of the current frame with data of the previous frame, removes noise from the current frame data according to the comparison result, and modulates the resultant data into overdriving data, such that it prevents noise components from being amplified by the overdriving.

The video processing method and apparatus for the LCD device according to the present invention transforms gray-level data into brightness data, modulates the brightness data into overdriving brightness data, and inverse-transforms the overdriving brightness data into the gray-level data, such that it prevents the occurrence of color inversion caused by the overdriving.

Also, the video processing method and apparatus for the LCD device according to the present invention removes noise components from input gray-level data, transforms the input data into brightness data, modulates gray-level data into overdriving brightness data, and inverse-transforms the overdriving brightness data into the gray-level data, such that it prevents the occurrence of noise and color inversion caused by the overdriving.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video processing method for a liquid crystal display (LCD) device comprising:
   detecting noise by comparing data of a previous frame with data of a current frame;
   if the noise is detected, removing the noise from the current frame data, and outputting the resultant current frame data having no noise together with the previous frame data; and
   comparing the previous frame data with the resultant current frame data having no noise in a lookup table, selecting overdriving data corresponding to the comparison result, and outputting the selected overdriving data, wherein the removing of the noise includes, if the noise is detected, outputting the current frame data as the same data as that of the previous frame data, thereby removing the noise component; and wherein the selecting of the overdriving data includes, if the previous frame data is equal to the current frame data, selecting data equal to the current frame data, and outputting the selected data.

2. The method according to claim 1, wherein the detecting of the noise includes:

detecting a difference in data between the previous frame and the current frame by comparing the previous frame data with the current frame data; and comparing the data difference between the previous frame and the current frame with a predetermined threshold value, detecting the data difference as noise if the data difference between the previous frame and the current frame is less than the threshold value, and detecting the data difference as non-noise if the data difference between the previous frame and the current frame is equal to or higher than the threshold value.

3. A video processing method for a liquid crystal display (LCD) device comprising:

transforming gray level data of previous and current frames into brightness and chrominance data;

comparing the brightness data of the previous frame with the brightness data of the current frame in a lookup table, selecting overdriving brightness data corresponding to the comparison result, and outputting the selected overdriving brightness data;

performing an inverse-transform process to the gray level data using the overdriving brightness and the chrominance data of the current frame;

before the transforming the gray level data into the brightness and chrominance data, detecting a difference in data between the previous frame and the current frame by comparing the gray level data of the previous frame with the gray level data of the current frame;

comparing the data difference between the previous frame and the current frame with a predetermined threshold value, detecting the data difference as noise if the data difference between the previous frame and the current frame is less than the threshold value, and detecting the data difference as non-noise if the data difference between the previous frame and the current frame is equal to or higher than the threshold value; and if the noise is detected, outputting the gray level data of the previous frame as data of the current frame.

4. A video processing apparatus for a liquid crystal display (LCD) device comprising:

a noise removing filter which detects noise by comparing data of a previous frame with data of a current frame, if the noise is detected, removes the noise from the current frame data, and outputs the resultant current frame data having no noise together with the previous frame data; and a lookup table which compares the previous frame data generated from the noise removing filter with the current frame data generated from the noise removing filter, selects overdriving data corresponding to the comparison result, and outputs the selected overdriving data, wherein the noise removing filter detects a difference in data between the previous frame and the current frame by comparing the previous frame data with the current frame data, compares the data difference between the previous frame and the current frame with a predetermined threshold value, detects the data difference as noise if the data difference between the previous frame and the current frame is less than the threshold value, detects the data difference as non-noise if the data difference between the previous frame and the current frame is equal to or higher than the threshold value, and outputs the previous frame data as the current frame data, if the noise is detected; and the lookup table, if the previous frame data generated from the noise removing filter is equal to the current frame data generated from the noise removing filter, selects the same data as the current frame data, and outputs the selected data.

5. A video processing apparatus for a liquid crystal display (LCD) device comprising:

a color-space transform unit for transforming gray level data of previous and current frames into brightness and chrominance data;

a lookup table for comparing the previous frame brightness data with the current frame brightness data generated from the color-space transform unit, selecting overdriving brightness data corresponding to the comparison result, and outputting the selected overdriving brightness data;

a color-space inverse transform unit for performing an inverse-transform process to the gray level data using the overdriving brightness data received from the lookup table and the current frame's chrominance data received from the color-space transform unit; and a noise removing filter which is connected to an input terminal of the color-space transform unit, detects a difference in data between the previous frame and the current frame by comparing the gray level data of the previous frame with the gray level data of the current frame, compares the data difference between the previous frame and the current frame with a predetermined threshold value, detects the data difference as noise if the data difference between the previous frame and the current frame is less than the threshold value, and detects the data difference as non-noise if the data difference between the previous frame and the current frame is equal to or higher than the threshold value, and if the noise is detected, outputs the gray level data of the previous frame as data of the current frame.

* * * * *